United States Patent
Lee et al.

(10) Patent No.: US 12,283,725 B2
(45) Date of Patent: Apr. 22, 2025

(54) OPEN-CATHODE-TYPE FUEL CELL SYSTEM AND AERIAL VEHICLE USING THE SAME

(71) Applicants: HYUNDAI MOTOR COMPANY, Seoul (KR); KIA CORPORATION, Seoul (KR)

(72) Inventors: In Seok Lee, Yongin-si (KR); Jeong Hee Park, Suwon-si (KR); Ji Han Lee, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 534 days.

(21) Appl. No.: 17/858,377

(22) Filed: Jul. 6, 2022

(65) Prior Publication Data

US 2023/0170499 A1 Jun. 1, 2023

(30) Foreign Application Priority Data

Nov. 30, 2021 (KR) .................. 10-2021-0168796

(51) Int. Cl.
*H01M 8/04119* (2016.01)
*B60L 50/72* (2019.01)
(Continued)

(52) U.S. Cl.
CPC ......... *H01M 8/04126* (2013.01); *B60L 50/72* (2019.02); *B64D 27/24* (2013.01);
(Continued)

(58) Field of Classification Search
CPC ..... H01M 2008/1095; H01M 2250/20; H01M 2008/147; H01M 16/006; H01M 2250/10; H01M 4/86; H01M 2004/8684; H01M 2004/8689; H01M 50/375; H01M 2008/1293; H01M 2250/30; H01M 50/40; H01M 16/003; H01M 2220/10; H01M 2220/20; H01M 50/20; H01M 50/202; H01M 50/224; H01M 2250/402;
(Continued)

(56) References Cited

U.S. PATENT DOCUMENTS

| | | | |
|---|---|---|---|
| 2010/0136445 A1* | 6/2010 | Morita | H01M 8/2483 429/480 |
| 2011/0039179 A1* | 2/2011 | Suh | H01M 8/241 429/423 |
| 2011/0117470 A1* | 5/2011 | Aras | H01M 8/04014 429/452 |

* cited by examiner

*Primary Examiner* — Adam A Arciero
(74) *Attorney, Agent, or Firm* — Morgan, Lewis & Bockius LLP (57) ABSTRACT

An open-cathode-type fuel cell system includes hollow fiber membranes, through which moisture contained in unreacted hydrogen discharged from a fuel cell stack is transferred to air flowing into the fuel cell stack, and an aerial vehicle using the same. The open-cathode-type fuel cell system includes a fuel cell stack configured to generate electricity through a reverse electrolysis reaction using hydrogen and air supplied from the outside, a humidifying structure disposed on one side of the fuel cell stack in order to transfer moisture included in unreacted hydrogen, discharged from the fuel cell stack, to air flowing into the fuel cell stack, and a cooling fan disposed on the other side of the fuel cell stack in order to discharge unreacted air, discharged from the fuel cell stack, and cooling air to the outside. Accordingly, the performance of the air-cooled fuel cell system may be improved.

13 Claims, 12 Drawing Sheets

(51) Int. Cl.
  *B64D 27/24* (2024.01)
  *H01M 8/04014* (2016.01)
  *H01M 8/04082* (2016.01)
  *H01M 8/04701* (2016.01)
  *H01M 8/04746* (2016.01)
  *H01M 8/0662* (2016.01)
  *H01M 8/2457* (2016.01)
(52) U.S. Cl.
  CPC ... *H01M 8/04014* (2013.01); *H01M 8/04201* (2013.01); *H01M 8/04701* (2013.01); *H01M 8/04753* (2013.01); *H01M 8/0687* (2013.01); *H01M 8/2457* (2016.02); *B60L 2200/10* (2013.01); *H01M 2250/20* (2013.01)
(58) Field of Classification Search
  CPC .......... B60L 58/33; Y02E 60/50; Y02T 90/40; B64D 2041/005
  See application file for complete search history.

OPEN-CATHODE-TYPE FUEL CELL SYSTEM AND AERIAL VEHICLE USING THE SAME

This application claims the benefit of priority to Korean Patent Application No. 10-2021-0168796, filed on Nov. 30, 2021 in the Korean Intellectual Property Office, the entire disclosure of which is hereby incorporated by reference.

TECHNICAL FIELD

The present disclosure relates to an air-cooled fuel cell system and an aerial vehicle using the same, and more particularly to an open-cathode-type fuel cell system capable of humidifying air flowing to a fuel cell stack by transferring moisture from unreacted hydrogen to the air, and to an aerial vehicle using the same.

BACKGROUND

Recently, with increasing concern about the depletion of fossil fuels and environmental pollution, new forms of renewable energy have been actively researched and developed. As one example thereof, a fuel cell is a device that directly converts the chemical energy of hydrogen into electrical energy through a catalytic reaction.

A polymer electrolyte membrane fuel cell (PEMFC) (hereinafter simply referred to as a "fuel cell") using hydrogen may yield 2-fold to 3-fold higher efficiency than a combustion method used in a conventional internal combustion engine. Hydrogen is an eco-friendly energy source that is capable of minimizing the generation of environmental pollutants, and has come to be commercially used in various fields through continuous research and development.

Such a fuel cell is drawing attention as an alternative power source to a secondary battery, which is conventionally used as a backup power source. A fuel cell has advantages of high response speed, low operation temperature, high system stability, high power density, high power generation efficiency, and fuel versatility. Therefore, research has been directed toward the application of a fuel cell as an energy source.

An open-cathode-type fuel cell (or an open-cathode-type fuel cell system) has a cathode structure that is open to the outside. The open-cathode-type fuel cell is configured such that external air is supplied to an open cathode flow path using an air blower (or a cooling fan), rather than using a separate fluid supply device. That is, in the open-cathode-type fuel cell, a stack is directly cooled using air supplied from the outside, rather than using a separate external cooling system. Therefore, compared to a water-cooled system, the open-cathode-type fuel cell has a simpler structure and is less costly to manufacture, and is thus widely used as a fuel cell system for an aerial vehicle.

However, in order to minimize the weight thereof, a conventional open-cathode-type fuel cell system is not equipped with a humidifier. Thus, there is a problem in that dry external air is directly introduced into a fuel cell stack, and thus the performance of the stack is deteriorated. That is, there may occur a problem in which an electrolyte membrane in the fuel cell stack is completely dried by the dry external air and thus fails to work properly.

The information disclosed in the Background section above is to aid in the understanding of the background of the present disclosure, and should not be taken as acknowledgement that this information forms any part of prior art.

SUMMARY

Accordingly, the present disclosure is directed to an open-cathode-type fuel cell system and an aerial vehicle using the same so as to obviate one or more problems due to limitations and disadvantages of the related art.

According to an aspect of the present disclosure, an open-cathode-type fuel cell system may be capable of improving the performance thereof using a simple structure mounted thereto, and an aerial vehicle using the same may be provided.

According to another aspect of the present disclosure, an open-cathode-type fuel cell system may be configured to humidify air flowing into a cathode, and an aerial vehicle using the same may be provided.

According to still another aspect of the present disclosure, an open-cathode-type fuel cell system may be configured to extract moisture from unreacted hydrogen discharged from a fuel cell stack and to humidify the air flowing into the fuel cell stack using the extracted moisture, and an aerial vehicle using the same may be provided.

According to still another aspect of the present disclosure, an open-cathode-type fuel cell system may be capable of filtering external foreign substances using a humidifying structure, and an aerial vehicle using the same may be provided.

In order to accomplish the above and other objects, an open-cathode-type fuel cell system according to an embodiment of the present disclosure includes a fuel cell stack configured to generate electricity through a reverse electrolysis reaction using hydrogen and air supplied from the outside, a humidifying structure disposed on one side of the fuel cell stack in order to transfer moisture included in unreacted hydrogen, discharged from the fuel cell stack, to air flowing into the fuel cell stack, and a cooling fan disposed on the other side of the fuel cell stack in order to discharge unreacted air, discharged from the fuel cell stack, and cooling air to the outside.

The humidifying structure may be disposed on one side of the fuel cell stack with respect to a flow direction of air flowing through the fuel cell stack.

The humidifying structure may include a pipe connected to the fuel cell stack to receive the unreacted hydrogen, a first support frame having a first end connected to the pipe to receive the unreacted hydrogen, a plurality of hollow fiber membranes, each of which has one end connected to the side surface of the first support frame to receive the unreacted hydrogen, and a second support frame, which has a side surface connected to the opposite end of each of the plurality of hollow fiber membranes and is disposed parallel to the first support frame.

The first support frame may have a second end which is opposite to the first end of the first support frame, and the second support frame may have two opposing ends which are open.

The first support frame and the second support frame may extend in a direction perpendicular to the supply direction of hydrogen supplied to the fuel cell stack.

The first support frame and the second support frame may extend in the same direction as the supply direction of hydrogen supplied to the fuel cell stack.

The plurality of hollow fiber membranes may be arranged in multiple rows.

The plurality of hollow fiber membranes may be arranged at regular intervals, or at irregular intervals.

Among the plurality of hollow fiber membranes, fiber membranes disposed in a middle portion of the humidifying structure may have smaller intervals than fiber membranes disposed in peripheral portions of the humidifying structure.

The pipe of the humidifying structure may be connected to a lower end plate of the fuel cell stack to receive the unreacted hydrogen.

The fuel cell stack may receive hydrogen, and the hydrogen may be supplied to the fuel cell stack in a direction perpendicular to the flow direction of air flowing into the fuel cell stack.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternative forms, and should not be construed as being limited to the exemplary embodiments set forth herein.

Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of exemplary embodiments of the disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Meanwhile, when a certain embodiment is capable of being realized in a different manner, functions or operations specified in a specific block can be executed in an order different from that shown in a flowchart. For example, two consecutive blocks can be executed simultaneously, or can be executed in the reverse order, depending on the related function or operation.

Figure 1A:
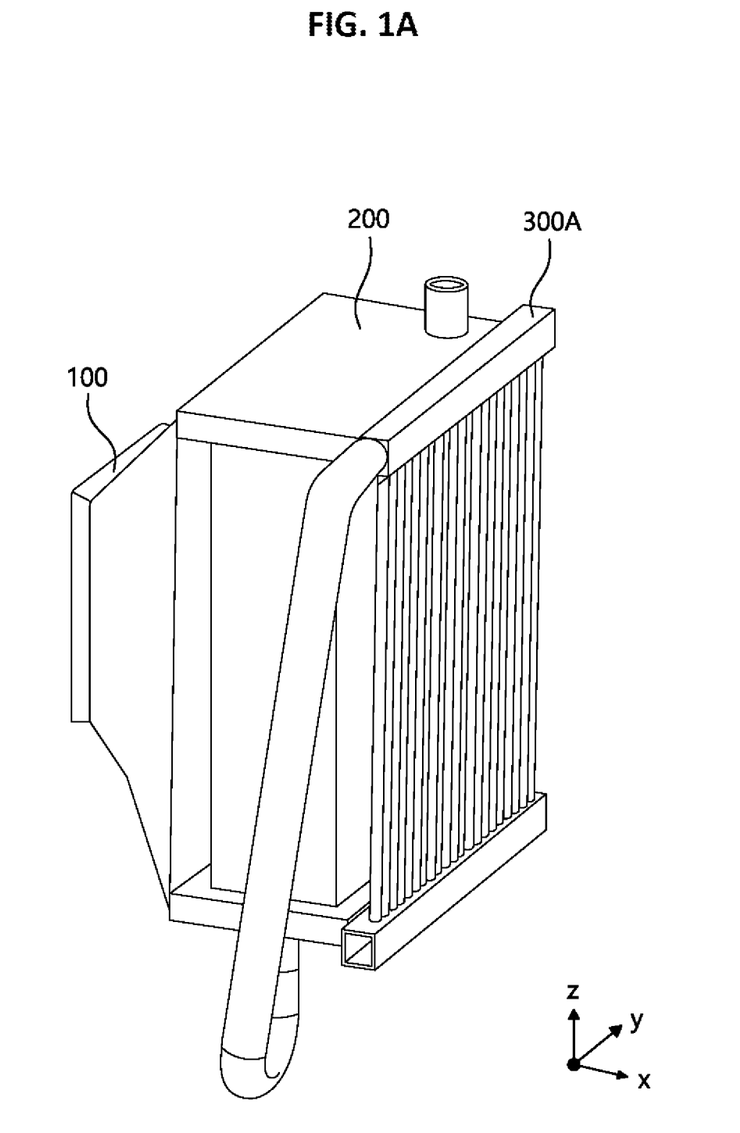
FIG. 1A is a perspective view of a fuel cell system according to an embodiment of the present disclosure.

Hereinafter, the configurations and operations of a fuel cell system and an aerial vehicle according to an embodiment of the present disclosure will be described with reference to the accompanying drawings. FIG. 1A is a perspective view of a fuel cell system according to an embodiment of the present disclosure, and FIG. 1B is a plan view schematically showing the fuel cell system shown in FIG. 1A.

Figure 1B:
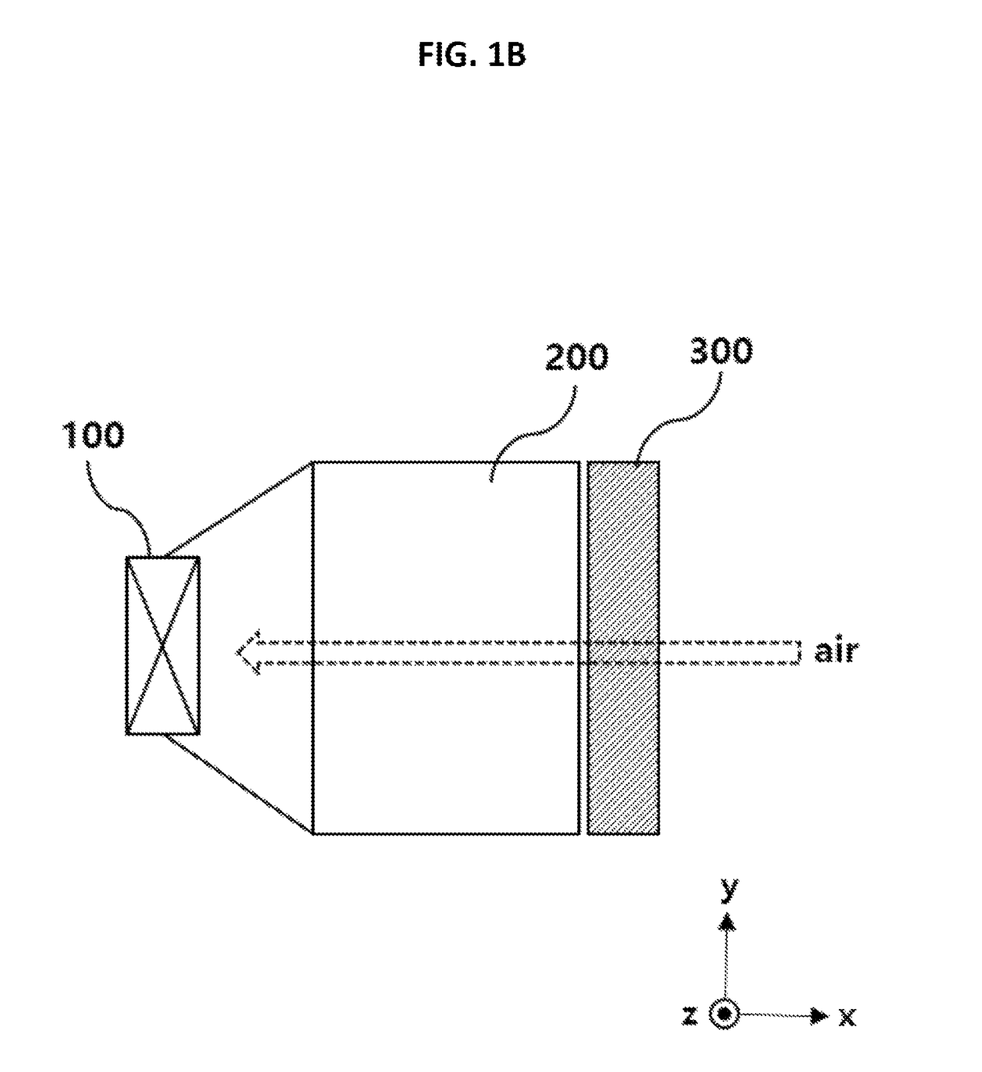
FIG. 1B is a plan view schematically showing the fuel cell system shown in FIG. 1A.

As shown in FIGS. 1A and 1B, the fuel cell system according to an embodiment of the present disclosure mainly includes a cooling fan 100, a fuel cell stack 200, and a humidifying structure 300A. The fuel cell system according to an embodiment of the present disclosure is configured such that a humidifying structure is disposed outside a fuel cell stack in an air-cooled structure employing an open-type cathode, rather than using a separate humidifier. In the fuel cell system according to an embodiment of the present disclosure, the air introduced from the outside is humidified while passing through the humidifying structure 300, enters the fuel cell stack 200, and is discharged to the outside through the cooling fan 100.

The fuel cell stack 200 generates electricity through a reverse electrolysis reaction using hydrogen, which is supplied from a hydrogen tank (not shown), and air.

The humidifying structure 300 is disposed on one side of the fuel cell stack 200 to transfer moisture contained in unreacted hydrogen, discharged from the fuel cell stack 200, to air introduced into the fuel cell stack 200. The cooling fan 100 is disposed on the opposite side of the fuel cell stack 200 to discharge unreacted air and cooling air, discharged from the fuel cell stack 200, to the outside.

As shown in FIG. 1B, the air introduced from the outside is discharged to the outside via the humidifying structure 300 and the fuel cell stack 200 by the cooling fan 100. Drive force for causing movement of air is generated by the difference in pressure between an inlet and an outlet, which is generated by the cooling fan 100.

Figure 2A:
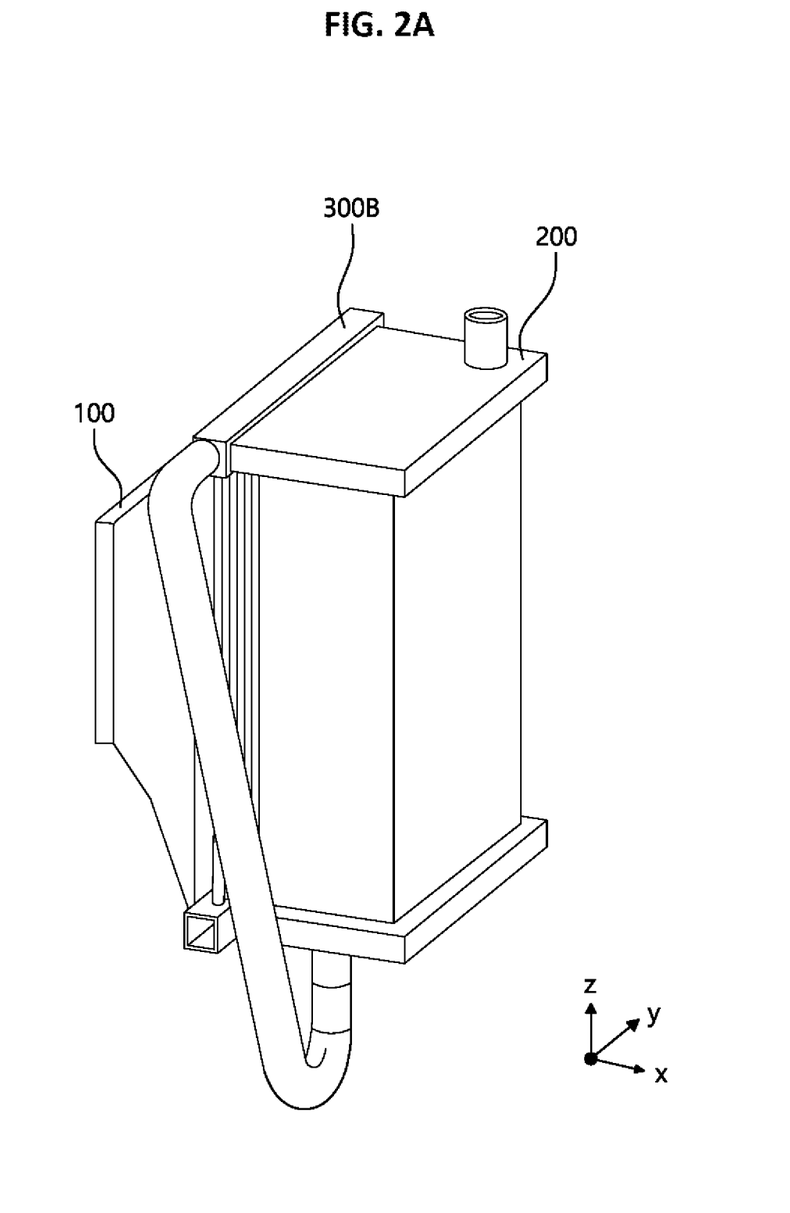
FIG. 2A is a perspective view of a fuel cell system according to another embodiment of the present disclosure.
Figure 2B:
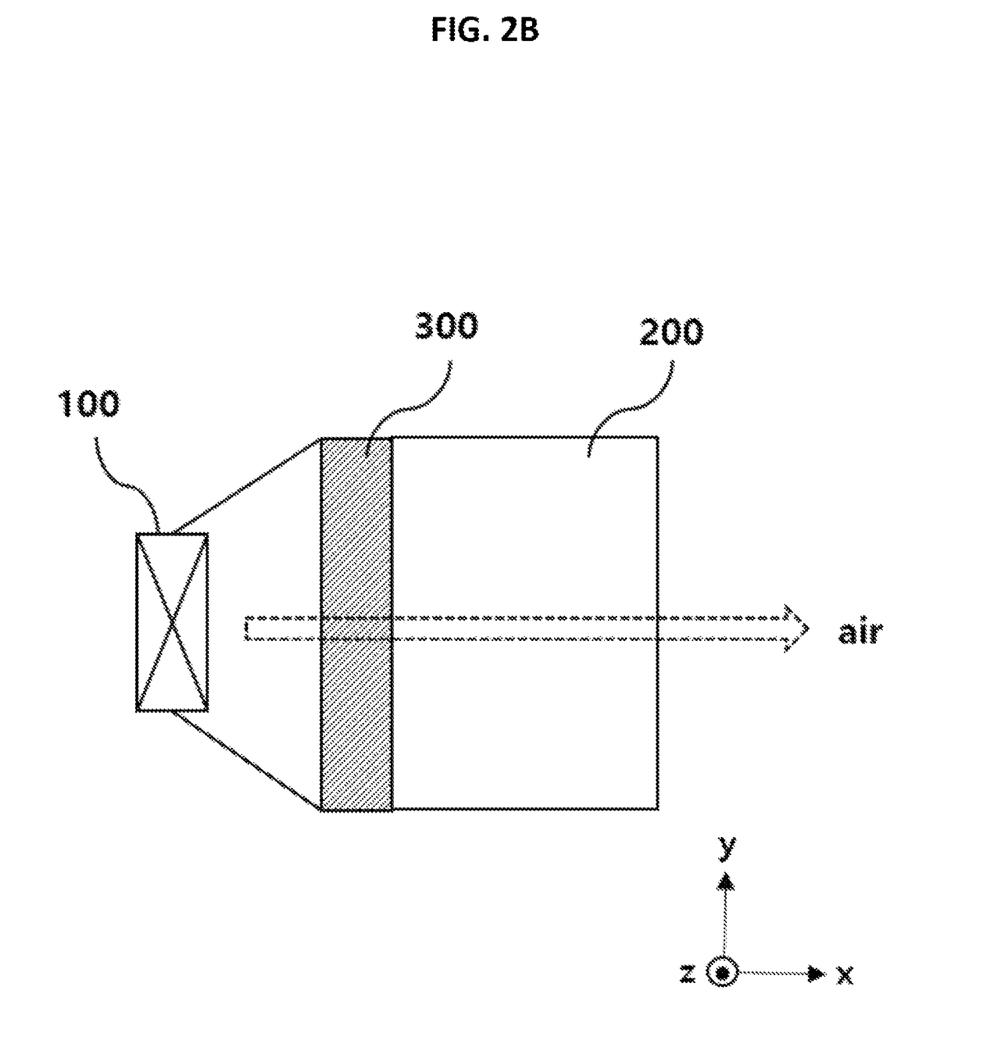
FIG. 2B is a plan view schematically showing the fuel cell system shown in FIG. 2A.

FIG. 2A is a perspective view of a fuel cell system according to another embodiment of the present disclosure, and FIG. 2B is a plan view schematically showing the fuel cell system shown in FIG. 2A. Unlike the structure shown in FIGS. 1A and 1B, a humidifying structure 300B is disposed between the cooling fan 100 and the fuel cell stack 200. In this case, the air introduced by the cooling fan 100 is humidified while passing through the humidifying structure 300B, and is transferred to the fuel cell stack 200.

The feature common to both the fuel cell system shown in FIGS. 1A and 1B and the fuel cell system shown in FIGS. 2A and 2B is that the humidifying structure 300A or 300B is disposed upstream of the fuel cell stack 200 with respect to the direction in which external air flows through the fuel cell stack 200. That is, in the case illustrated in FIG. 1B, external air is humidified while passing through the humidifying structure 300A and then flows into the fuel cell stack 200, and in the case illustrated in FIG. 2B, external air introduced by the cooling fan 100 is humidified by the humidifying structure 300B and is then transferred to the fuel cell stack 200, which is located downstream of the humidifying structure 300B.

Figure 3:
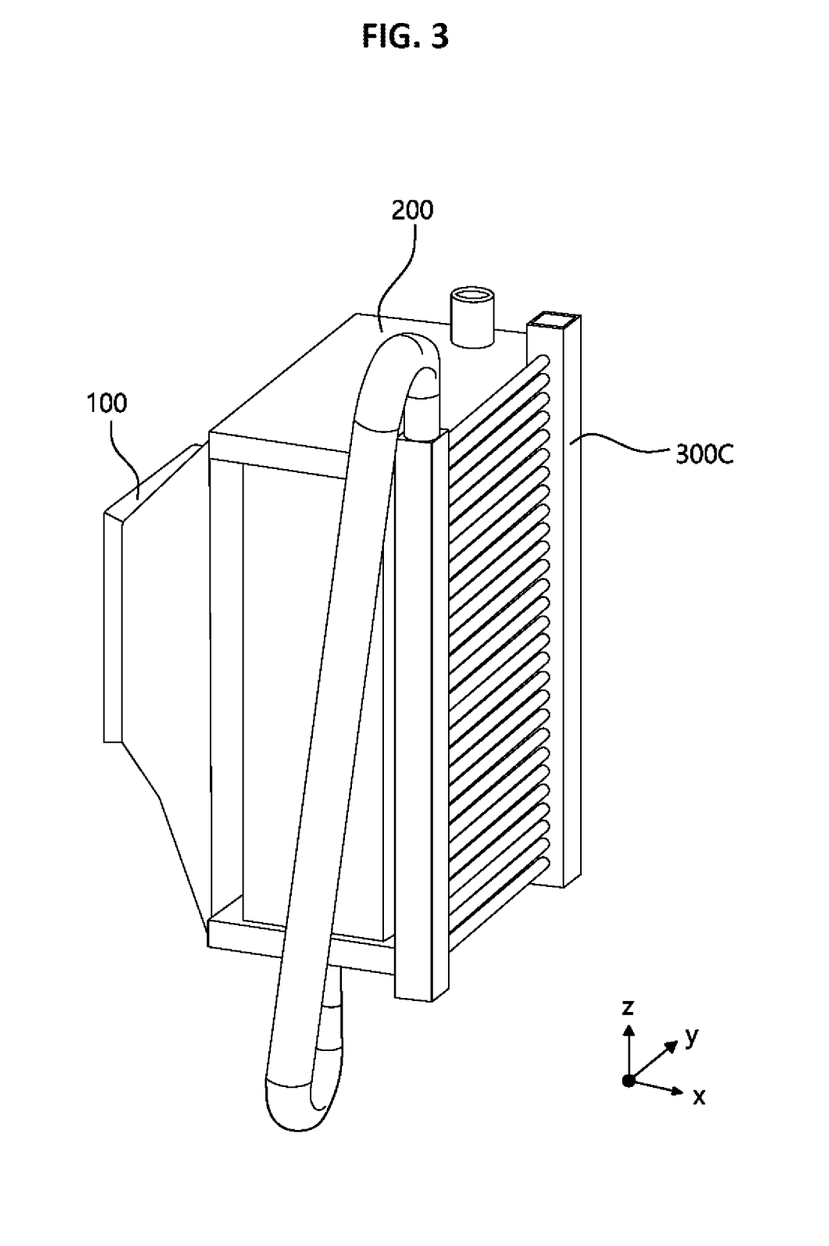
FIG. 3 is a perspective view of a fuel cell system according to still another embodiment of the present disclosure.

FIG. 3 is a perspective view of a fuel cell system according to still another embodiment of the present disclosure. Similar to the fuel cell system according to the first embodiment shown in FIG. 1A, the fuel cell system according to the embodiment shown in FIG. 3 is configured such that a humidifying structure 300C is disposed on one side of the fuel cell stack 200. However, the humidifying structure 300C of this embodiment is disposed in a direction perpendicular to the direction in which the humidifying structure 300A of the first embodiment is disposed. That is, frames constituting the humidifying structure 300C are disposed in the same direction as the direction in which hydrogen is supplied to the fuel cell stack 200.

Figure 4A:
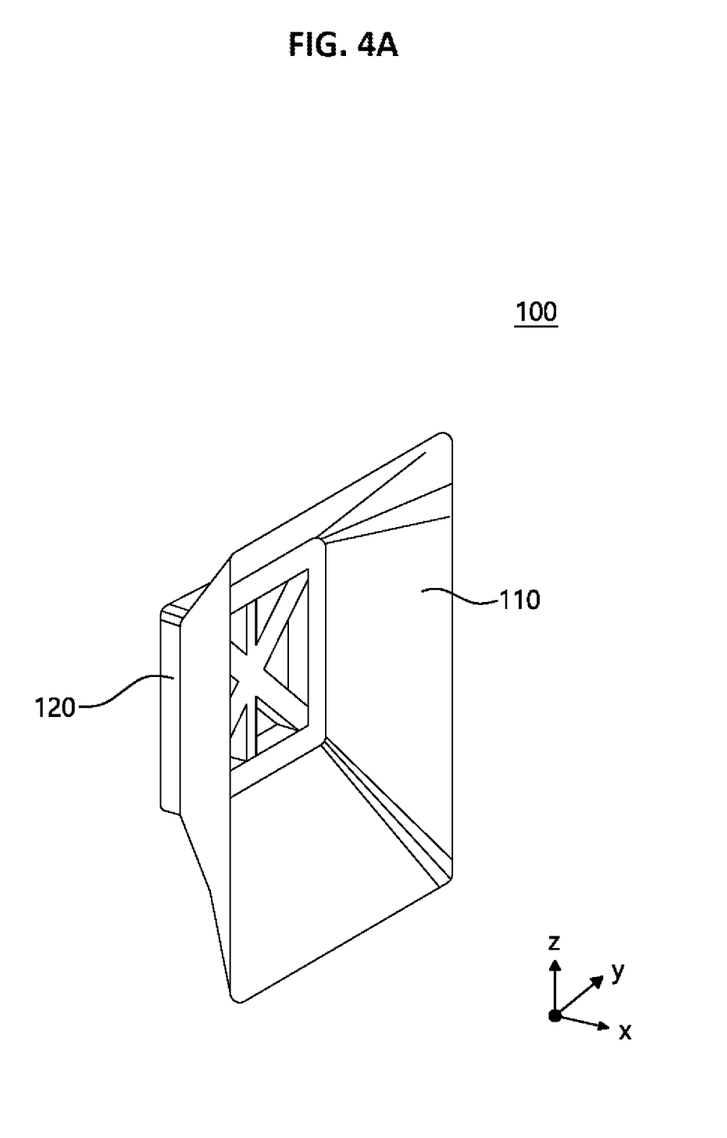
FIG. 4A is an exemplary view of the structure of a cooling fan included in the fuel cell system according to an embodiment of the present disclosure.
Figure 4B:
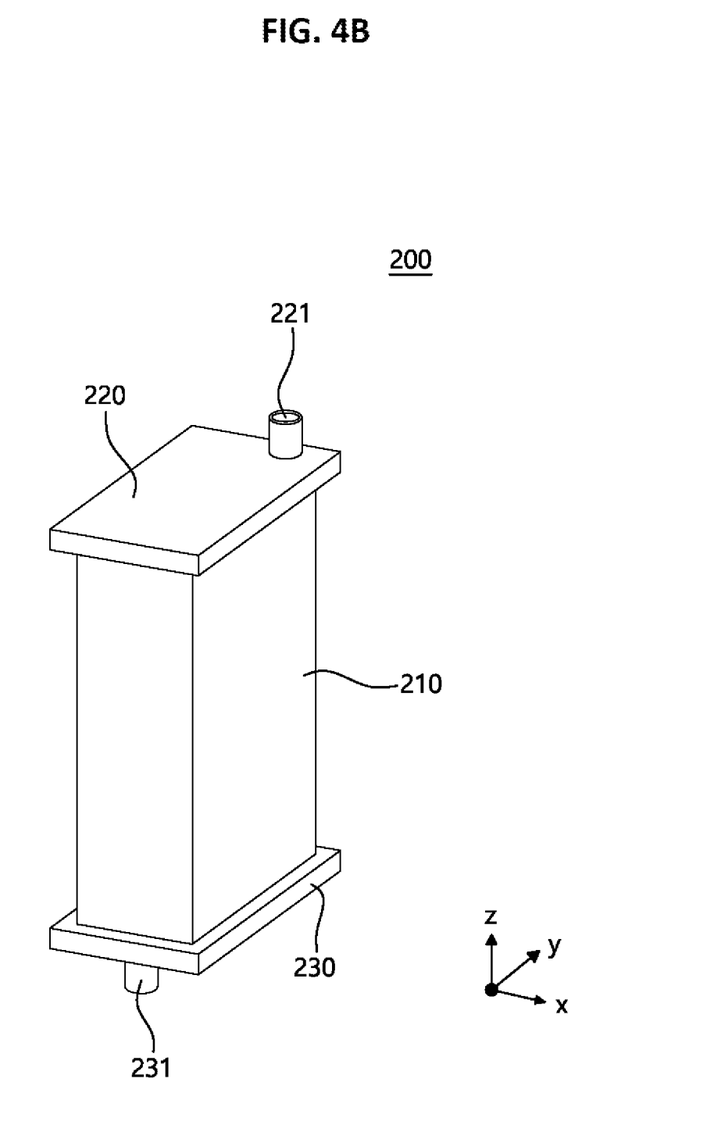
FIG. 4B is an exemplary view of the structure of a fuel cell stack included in the fuel cell system according to an embodiment of the present disclosure.
Figure 4C:
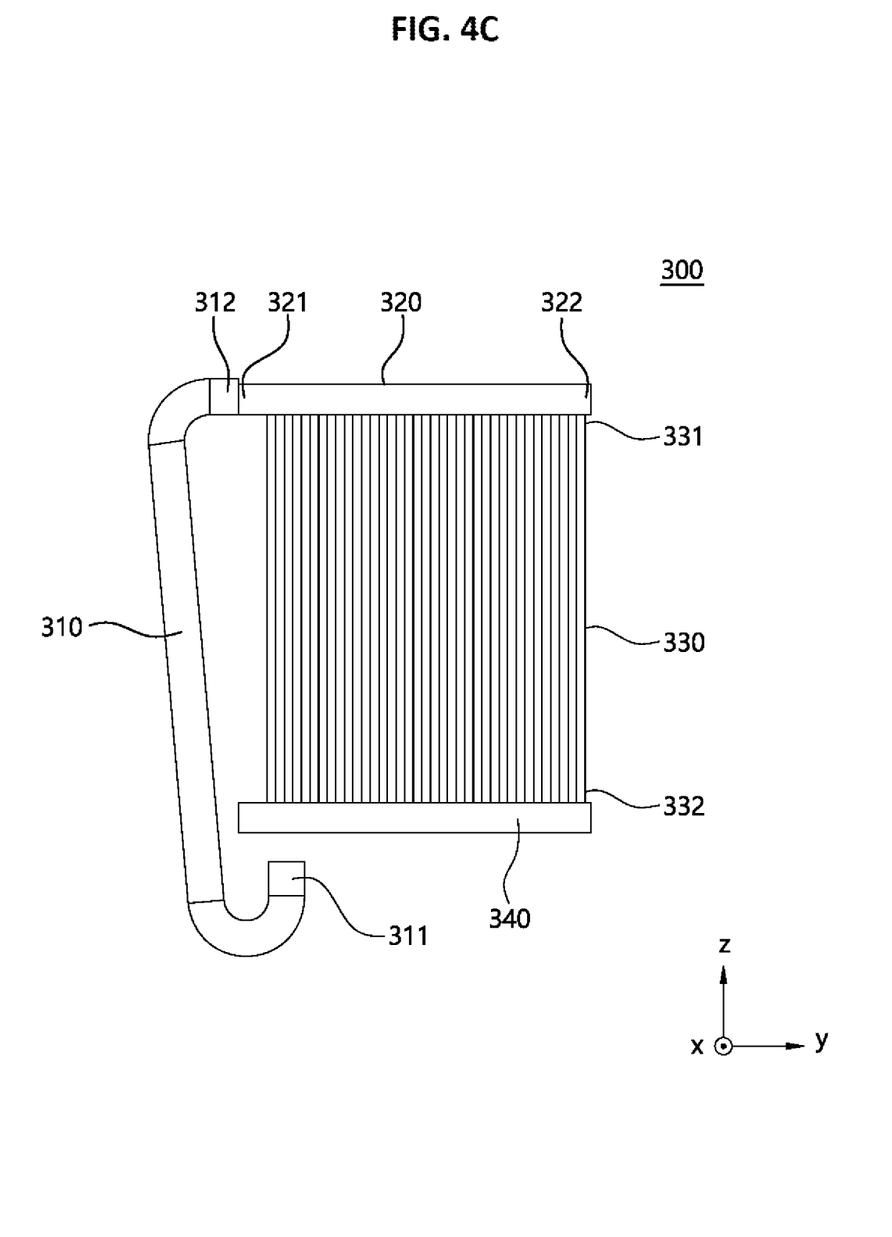
FIG. 4C is an exemplary view of a humidifying structure included in the fuel cell system according to an embodiment of the present disclosure.

FIGS. 4A, 4B and 4C show components included in the fuel cell system according to an embodiment of the present disclosure in detail. As shown in FIG. 4A, the cooling fan 100 of the fuel cell system according to an embodiment of the present disclosure includes an enclosure 110 and a fan motor 120. The air in the enclosure 110 may be discharged to the outside of the enclosure 110 due to the pressure difference generated by rotation of the fan motor 120.

As shown in FIG. 4B, the fuel cell stack 200 of the fuel cell system according to an embodiment of the present disclosure includes a stack body 210 in which a plurality of unit cells is stacked, an upper end plate 220 disposed at the upper end of the stack body 210, and a lower end plate 230 disposed at the lower end of the stack body 210. The upper end plate 220 is provided with a hydrogen inlet 221 for receiving hydrogen from a hydrogen tank, and the lower end plate 230 is provided with an unreacted hydrogen outlet 231 for discharging unreacted hydrogen from the stack body 210.

The hydrogen supplied to the stack body 210 is transferred to an anode, which is an electrode layer, and the oxygen (air) is transferred to a cathode. The hydrogen supplied to the anode is decomposed into hydrogen ions (protons) (H+) and electrons (e−) by a catalyst of the electrode layer. Only the hydrogen ions are selectively transferred to the cathode through an electrolyte membrane, which is a cation exchange membrane, and at the same time, the electrons are transferred to the cathode through a gas diffusion layer and a separator, which are conductors. In the cathode, the hydrogen ions supplied through the electrolyte membrane and the electrons transferred through the separator meet oxygen contained in the air supplied to the cathode by an air supply device, thus causing a reaction that generates water. In this process, the movement of the hydrogen ions causes the electrons to flow through an external wire, and current is generated by the flow of the electrons.

As shown in FIG. 4C, the humidifying structure 300 of the fuel cell system according to an embodiment of the present disclosure includes a pipe 310, which is connected to the unreacted hydrogen outlet 231 to receive the unreacted hydrogen, a first support frame 320, which receives the unreacted hydrogen through the pipe 310, a plurality of hollow fiber membranes 330, one end of each of which is connected to the side surface of the first support frame 320, and a second support frame 340, which is connected at the side surface thereof to the opposite end of each of the hollow fiber membranes 330. The first support frame 320 and the second support frame 340 are formed in the shape of a hollow rectangular pipe, and are disposed parallel to each other. However, the rectangular pipe shape is given merely by way of example, and the cross-sectional shape of the first and second support frames 320 and 340 is not limited to a rectangle.

The pipe 310 includes a first connection portion 311, which is connected to the unreacted hydrogen outlet 231. In addition, the pipe 310 includes a second connection portion 312, which is connected to a first end portion 321 of the first support frame 320. In addition, the first support frame 320 includes a second end portion 322, which is closed. The second support frame 340 includes two opposite end portions 341, which are open.

Each of the hollow fiber membranes 330 includes a first connection portion 331, which is connected to the side surface of the first support frame 320, and a second connection portion 332, which is connected to the side surface of the second support frame 340.

Figure 4D:
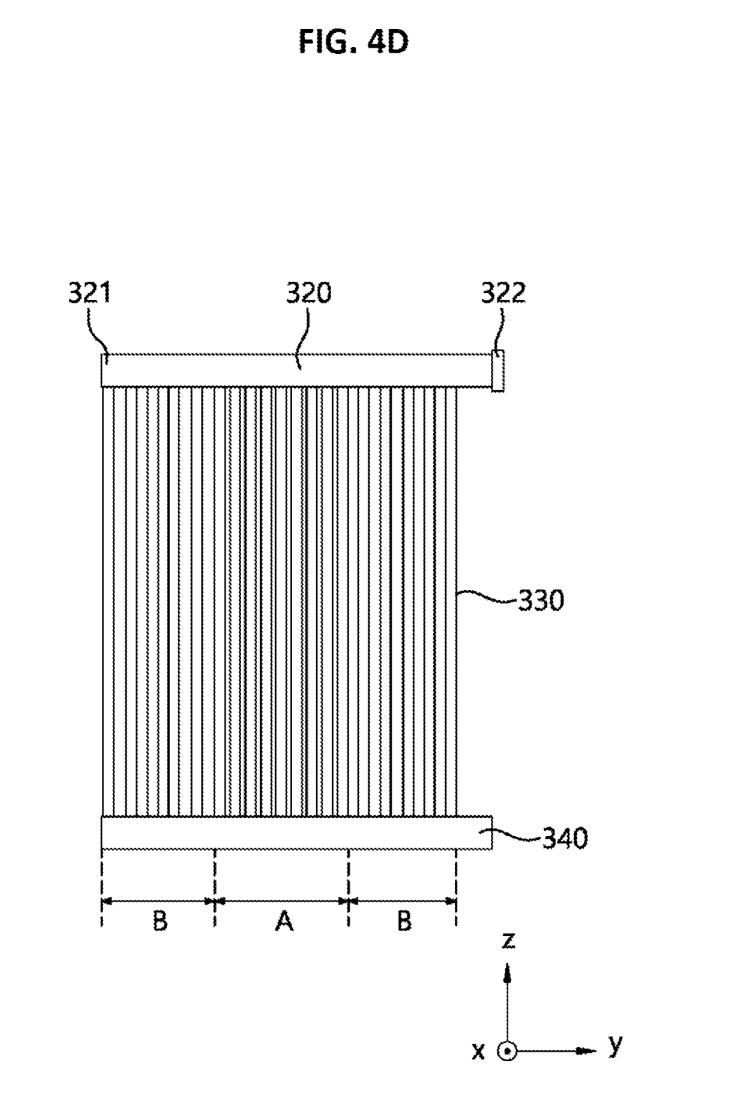
FIG. 4D is an exemplary view of a humidifying structure included in a fuel cell system according to another embodiment of the present disclosure.

FIG. 4D is an exemplary view of a humidifying structure included in a fuel cell system according to another embodiment of the present disclosure. In the humidifying structure according to the embodiment shown in FIG. 4C, the hollow fiber membranes 330 are arranged at regular intervals, but in the humidifying structure according to the embodiment shown in FIG. 4D, the intervals at which the hollow fiber membranes 330 are arranged are not uniform. The intervals at which the hollow fiber membranes 330 are arranged in the middle portion A of the humidifying structure may be smaller than the intervals at which the hollow fiber membranes 330 are arranged in the peripheral portions B of the humidifying structure. Accordingly, the differential pressure generated by the cooling fan 100 is increased by reducing the intervals between the hollow fiber membranes arranged 330 in the middle portion A of the humidifying structure, thereby preventing fluid from concentratedly flowing through the middle portion A and inducing the flow of the fluid to the peripheral portions B, thus leading to improved flow distribution.

Figure 4E:
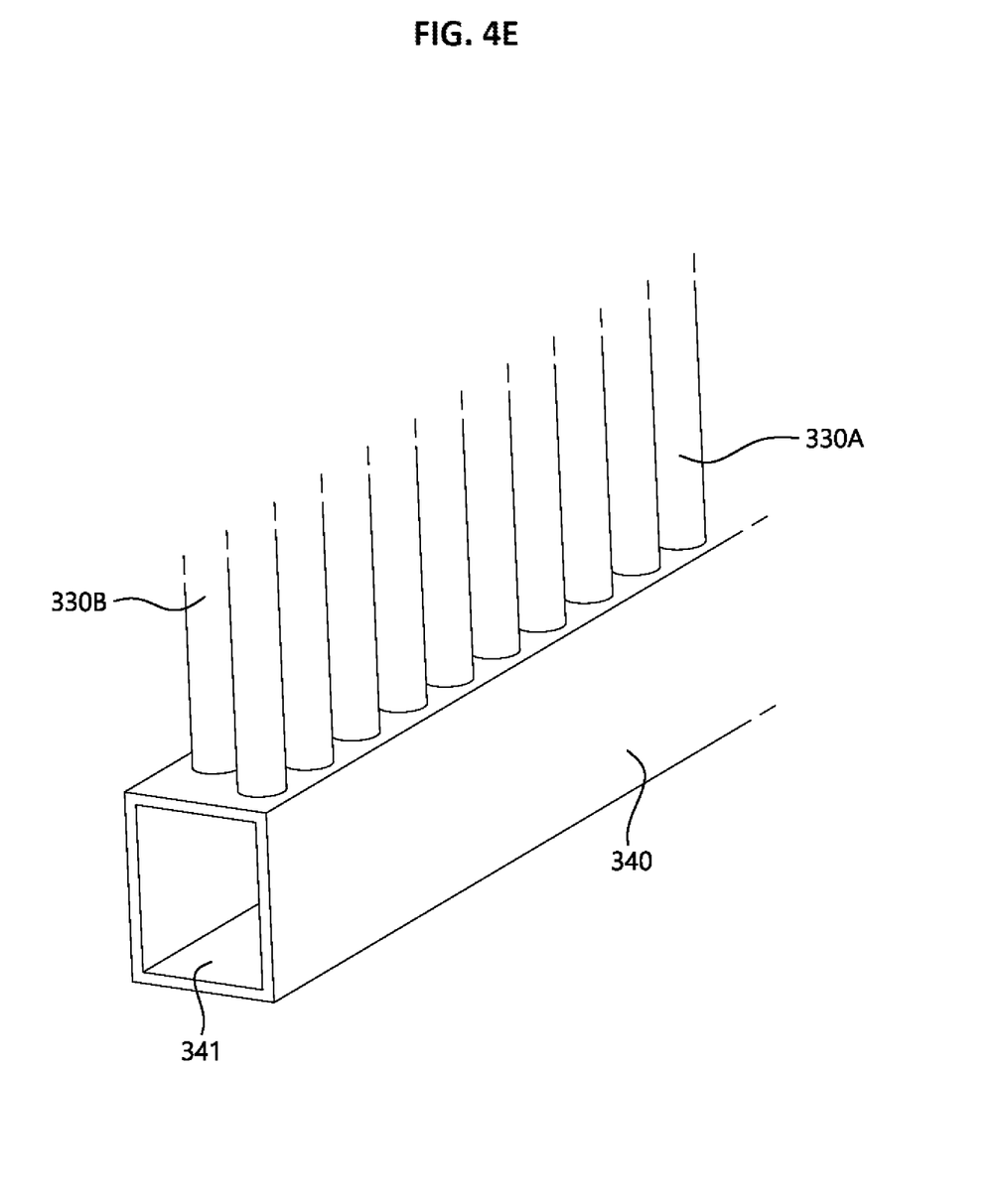
FIG. 4E is an exemplary view of a humidifying structure included in a fuel cell system according to still another embodiment of the present disclosure.

FIG. 4E is an exemplary view of a humidifying structure included in a fuel cell system according to still another embodiment of the present disclosure. In this embodiment, some of the hollow fiber membranes are arranged in a first row 330A, and the others are arranged in a second row 330B. Although the hollow fiber membranes are shown by way of example as being arranged in two rows, the hollow fiber membranes may be arranged in a greater number of rows.

Figure 5:
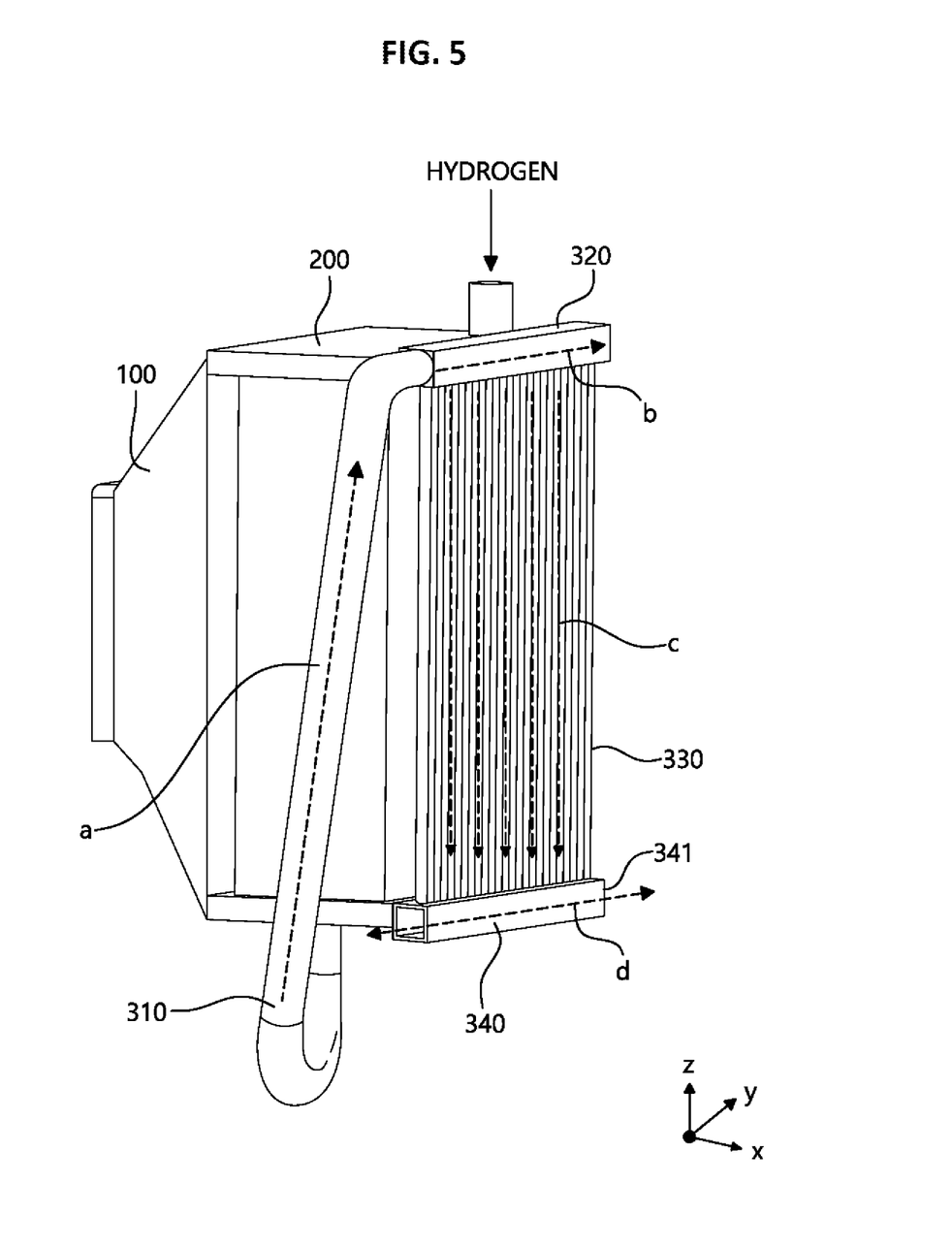
FIG. 5 is an exemplary view showing the direction in which hydrogen moves in the fuel cell system according to an embodiment of the present disclosure.

FIG. 5 is an exemplary view showing the direction in which hydrogen moves in the fuel cell system according to an embodiment of the present disclosure. Hydrogen flows from a hydrogen tank to the stack body 210 through the hydrogen inlet 221 formed in the upper end plate 220 of the fuel cell stack 200. Most of the hydrogen reacts in the stack body 210 to generate electricity, and remaining unreacted hydrogen is discharged to the pipe 310 through the unreacted hydrogen outlet 231 formed in the lower end plate 230 of the fuel cell stack 200. At this time, the humidity of the unreacted hydrogen, which is discharged through the unreacted hydrogen outlet 231, increases while the unreacted hydrogen passes through the stack body 210. The unreacted hydrogen moves in the pipe 310 in the direction indicated by "a". The unreacted hydrogen transferred to the first support frame 320 moves in the first support frame 320 in the direction indicated by "b". Since the second end portion 322 of the first support frame 320 is closed, the unreacted hydrogen moves in the hollow fiber membranes 330 in the direction indicated by "c" through the first connection portion 331 of each of the hollow fiber membranes 330, which is connected to the side surface of the first support frame 320. While the high-humidity unreacted hydrogen passes through the hollow fiber membranes 330, moisture is transferred from the unreacted hydrogen to the air introduced through the hollow fiber membranes 330 due to moisture transfer characteristics resulting from a concentration difference. The hydrogen, from which moisture has been transferred to the introduced air, flows into the second support frame 340 through the second connection portion 332 of each of the hollow fiber membranes 330, moves in the second support frame 340 in the directions indicated by "d", and is discharged to the outside through the two opposite end portions 341 of the second support frame 340, which are open. The humidified air is introduced into the fuel cell stack 200, and is divided into air for a reverse electrolysis reaction and air for cooling the stack. The unreacted air and the cooling air that have passed through the fuel cell stack 200 are discharged to the outside through the cooling fan 100.

Figure 6:
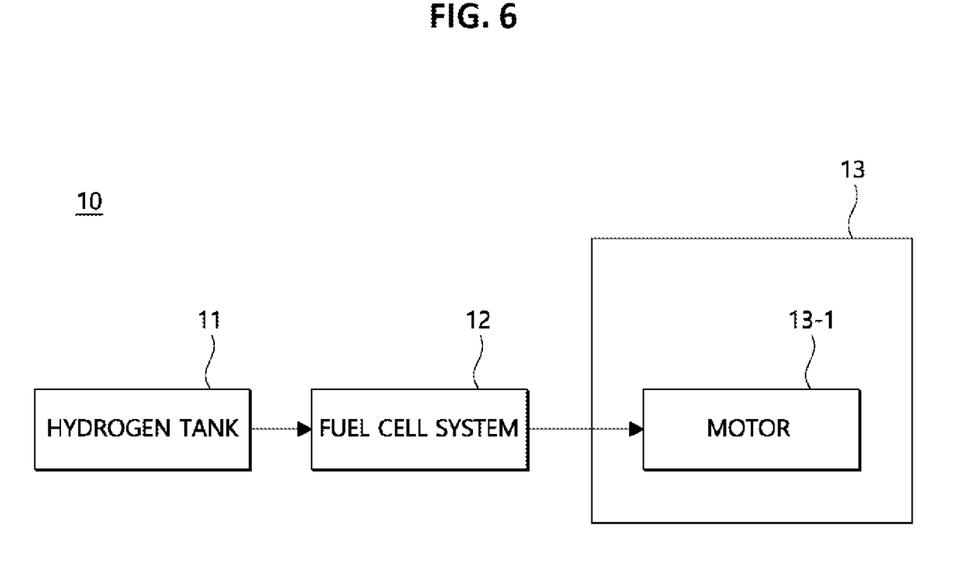
FIG. 6 is a block diagram schematically showing the configuration of an aerial vehicle according to an embodiment of the present disclosure.

FIG. 6 is a block diagram schematically showing the configuration of an aerial vehicle according to an embodiment of the present disclosure. As illustrated, an aerial vehicle 10 according to an embodiment of the present disclosure includes at least one hydrogen tank 11, a fuel cell system 12, which receives hydrogen from the hydrogen tank 11 to generate electricity, a motor 13-1, which rotates using the electricity provided from the fuel cell system 12, and a flight body 13, which flies using the rotational force of the motor 13-1.

As described above, according to the fuel cell system and the aerial vehicle using the same according to an embodiment of the present disclosure, the ion conductivity of the electrolyte membrane in the fuel cell stack may be improved through the structure for humidifying air at the cathode side, and thus the performance of the fuel cell stack may be improved. In addition, the hydrogen discharged after the reverse electrolysis reaction may be recycled such that moisture contained therein is transferred to air flowing into the fuel cell stack, and external foreign substances may be filtered by the humidifying structure.

As is apparent from the above description, in the open-cathode-type fuel cell system and the aerial vehicle using the same according to an embodiment of the present disclosure, moisture contained in unreacted hydrogen discharged from the fuel cell stack is transferred to external air flowing into the fuel cell stack through hollow fiber membranes, whereby the performance of the air-cooled fuel cell system may be improved. In addition, manufacture and assembly of the fuel cell system may be easily achieved, and thus freedom in the manufacture of components thereof may be increased.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An open-cathode-type fuel cell system comprising:
a fuel cell stack configured to generate electricity through a reverse electrolysis reaction using hydrogen and air supplied from an outside;
a humidifying structure disposed on one side of the fuel cell stack, the humidifying structure being configured to transfer moisture included in unreacted hydrogen, discharged from the fuel cell stack, to air flowing into the fuel cell stack; and
a cooling fan disposed on another side of the fuel cell stack, the cooling fan being configured to discharge unreacted air, discharged from the fuel cell stack, and cooling air to the outside.

2. The open-cathode-type fuel cell system according to claim 1, wherein the humidifying structure is disposed on one side of the fuel cell stack with respect to a flow direction of air flowing through the fuel cell stack.

3. The open-cathode-type fuel cell system according to claim 1, wherein the humidifying structure comprises:
a pipe connected to the fuel cell stack to receive the unreacted hydrogen;
a first support frame having a first end connected to the pipe to receive the unreacted hydrogen;
a plurality of hollow fiber membranes, each of which has one end connected to a side surface of the first support frame to receive the unreacted hydrogen; and
a second support frame having a side surface connected to an opposite end of each of the plurality of hollow fiber membranes, the second support frame being disposed in parallel to the first support frame.

4. The open-cathode-type fuel cell system according to claim 3, wherein the first support frame has a second end which is opposite to the first end of the first support frame and is closed, and the second support frame has two opposing ends which are open.

5. The open-cathode-type fuel cell system according to claim 4, wherein the first support frame and the second support frame extend in a direction perpendicular to a supply direction of hydrogen supplied to the fuel cell stack.

6. The open-cathode-type fuel cell system according to claim 4, wherein the first support frame and the second support frame extend in a same direction as a supply direction of hydrogen supplied to the fuel cell stack.

7. The open-cathode-type fuel cell system according to claim 3, wherein the plurality of hollow fiber membranes are arranged in multiple rows.

8. The open-cathode-type fuel cell system according to claim 3, wherein the plurality of hollow fiber membranes are arranged at regular intervals.

9. The open-cathode-type fuel cell system according to claim 3, wherein the plurality of hollow fiber membranes arranged at irregular intervals.

10. The open-cathode-type fuel cell system according to claim 9, wherein among the plurality of hollow fiber membranes, fiber membranes disposed in a middle portion of the humidifying structure has smaller intervals than fiber membranes disposed in peripheral portions of the humidifying structure.

11. The open-cathode-type fuel cell system according to claim 3, wherein the pipe is connected to a lower end plate of the fuel cell stack to receive the unreacted hydrogen.

12. The open-cathode-type fuel cell system according to claim 1, wherein the fuel cell stack receives hydrogen, and the hydrogen is supplied to the fuel cell stack in a direction perpendicular to a flow direction of air flowing into the fuel cell stack.

13. An aerial vehicle comprising:
at least one hydrogen tank;
the open-cathode-type fuel cell system of claim 1, the open-cathode-type fuel cell system being configured to receive hydrogen from the at least one hydrogen tank to generate electricity; and
a flight body configured to fly using the electricity generated by the open-cathode-type fuel cell system.

* * * * *